United States Patent
Wu et al.

(10) Patent No.: US 8,068,584 B2
(45) Date of Patent: Nov. 29, 2011

(54) SYSTEM AND METHOD FOR SELECTING A PROFILE FOR A DIGITAL SUBSCRIBER LINE

(75) Inventors: Xidong Wu, Livermore, CA (US); Zhi Li, San Ramon, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1341 days.

(21) Appl. No.: 11/588,858

(22) Filed: Oct. 26, 2006

(65) Prior Publication Data

US 2008/0101591 A1    May 1, 2008

(51) Int. Cl.
*H04M 1/24* (2006.01)
*H04M 3/08* (2006.01)
*H04M 3/22* (2006.01)

(52) U.S. Cl. ..................... 379/1.04; 379/1.03
(58) Field of Classification Search .............. 379/1.03, 379/1.04
See application file for complete search history.

(56) References Cited

U.S. PATENT DOCUMENTS

| | | | |
|---|---|---|---|
| 6,236,664 B1 | 5/2001 | Erreygers | |
| 6,985,559 B2 | 1/2006 | Hardy | |
| 7,684,546 B2 * | 3/2010 | Rhee et al. | 379/1.04 |
| 2005/0163286 A1 | 7/2005 | Jiang et al. | |
| 2005/1017511 | 8/2005 | Wu et al. | |
| 2006/0159026 A1 | 7/2006 | Wu et al. | |
| 2006/1015923 | 7/2006 | Jiang et al. | |
| 2006/0268733 A1 * | 11/2006 | Rhee et al. | 370/252 |

FOREIGN PATENT DOCUMENTS

WO    WO 99/26375    5/1999

* cited by examiner

*Primary Examiner* — Alexander Jamal
(74) *Attorney, Agent, or Firm* — Michael Roebuck

(57) ABSTRACT

A method for selecting a profile for a digital subscriber line is disclosed, the method including collecting code violation data for a plurality of digital subscriber lines, identifying a group of problem lines in the plurality of digital subscriber lines, modeling estimated code violations for each of a group profiles for each line in the group of problem lines and selecting one of the group of profiles. A system is disclosed for performing the method.

35 Claims, 7 Drawing Sheets

SYSTEM AND METHOD FOR SELECTING A PROFILE FOR A DIGITAL SUBSCRIBER LINE

FIELD OF THE DISCLOSURE

The present disclosure relates generally to selecting a profile for a communication line.

BACKGROUND

When an Internet Protocol (IP) user application, such as Web browsing, file transfer protocol (FTP), voice over internet protocol (VOIP), streaming video, etc., is running on IP network access connections such as asynchronous digital subscriber line (ADSL) or cable modem, the application quality can degrade in the presence of access line errors (physical layer impairments). Different user applications have different levels of line error tolerance. Voice applications can tolerate relatively higher line error levels than web browsing and Video.

A digital subscriber line (DSL), such as an ADSL line, can be configured to a particular profile based on service agreement, loop quality, and operating environment. A change in these factors, such as introduction of outside electromagnetic noise, degrades DSL performance. If the degradation is serious, the line may become a "problem line" and need a new profile to be assigned. With a large network, there may be thousands of DSL lines that become problem lines. The typical system used to make manual profile adjustments is to have a service technician change the DSL line profile in response to customer complaints received at a volume call center. This process may involve one or more truck rolls (sending a service technician to a customer site) which leads to increased DSL maintenance and service costs.

DETAILED DESCRIPTION

Figure 1:
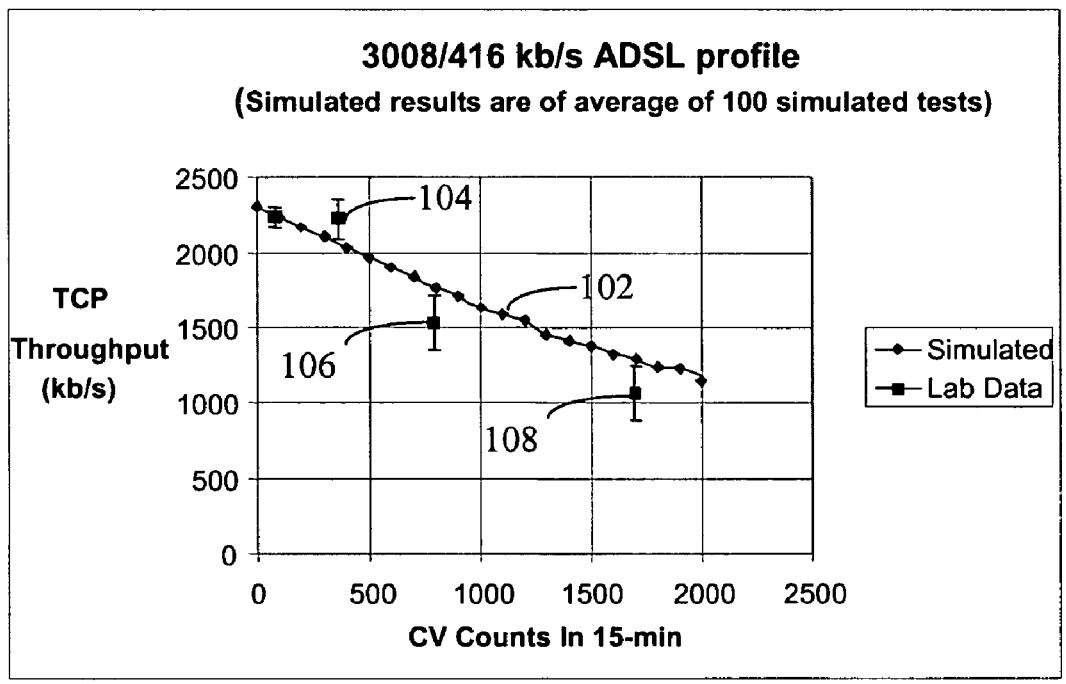
FIGS. 1-3 are graphs displaying an illustrative embodiment modeling results and lab tests.

In a particular embodiment a method for selecting a profile for a digital subscriber line is disclosed. A particular embodiment of the method includes but is not limited to collecting code violation data for a plurality of digital subscriber lines; identifying a group of problem lines in the plurality of digital subscriber lines; modeling estimated number of code violations for each of a plurality profiles for each line in the group of problem lines; and selecting one of the plurality of profiles. In another particular embodiment the modeling is stochastic modeling. In another particular embodiment selecting one of the plurality of profiles further comprises selecting one of the plurality of profiles which has a reduced number of estimated code violations for one line in the group of problem lines. In another particular embodiment the modeling further includes modeling a plurality of internet protocol applications and stochastically modeling estimated code violations for each of the plurality of internet protocol applications for each problem line. In another particular embodiment the plurality of internet protocol applications is selected from the group consisting of voice, data and video. In another particular embodiment the estimated number of code violations further comprises an average number of code violations for each of the plurality of profiles for each line in the group of problem lines. In another particular embodiment the code violation data is collected in real time. In another particular embodiment the code violation data is accessed from a stored historical code violation database.

In another particular embodiment the method further includes applying the selected one of the plurality of profiles to one of the plurality of problem lines. In another particular embodiment the method further includes reporting results indicating the selected profile for the problem line. In another particular embodiment the digital subscriber lines are associated with a digital subscriber line aggregator multiplexer. In another particular embodiment the code violation data is stored on a digital subscriber line aggregator multiplexer.

In another particular embodiment a computer readable medium containing a computer program for performing a method for selecting a profile for a digital subscriber line is disclosed. The computer program includes but is not limited to instructions to collect code violation data for a plurality of digital subscriber lines; instructions to identify a group of problem lines in the plurality of digital subscriber lines; instructions to model estimated number of code violations for each of a plurality profiles for each line in the group of problem lines; and instructions to select one of the plurality of profiles. In another particular embodiment the instructions to model is stochastic modeling. In another aspect of a particular embodiment the instructions to select one of the plurality of profiles further comprises selecting one of the plurality of profiles which has a reduced number of estimated code violations for one line in the group of problem lines. In another particular embodiment the instructions to model further comprise instructions to model a plurality of internet protocol applications and stochastically model estimated code violations for each of the plurality of internet protocol applications for each problem line. In another particular embodiment the plurality of internet protocol applications is selected from the group consisting of voice, data and video. In another particular embodiment the estimated number of code violations further comprises an average number of code violations for each of a plurality of profiles for each line in the group of problem lines. In another particular embodiment the code violation data is collected in real time. In another particular embodiment the code violation data is accessed from a historical code violation database.

In another particular embodiment the method further includes applying the selected one of the plurality of profiles to one of the plurality of problem lines. In another particular embodiment the method further includes reporting results indicating the selected profile for the problem line. In another particular embodiment the method further includes the digital subscriber lines are associated with a digital subscriber line aggregator multiplexer. In another particular embodiment the code violation data is stored on a digital subscriber line aggregator multiplexer.

In another particular embodiment a system for selecting a profile for a digital subscriber line is disclosed. The system includes but is not limited to a processor in data communication with a memory and a computer program stored in the memory. The computer program includes but is not limited to instructions to collect code violation data for a plurality of digital subscriber lines, instructions to identify a group of problem lines in the plurality of digital subscriber lines, instructions to model estimated number of code violations for each of a plurality profiles for each line in the group of problem lines and instructions to select one of the plurality of profiles. In another particular embodiment the instructions to model further comprises stochastic modeling. In another particular embodiment the instructions to select one of the plurality of profiles further comprises selecting one of the plurality of profiles which has a reduced number of estimated code violations for one line in the group of problem lines. In another particular embodiment the instructions to model further comprise instructions to model a plurality of internet protocol applications and stochastically model estimated code violations for each of the plurality of internet protocol applications for each problem line. In another particular embodiment the plurality of internet protocol applications is selected from the group consisting of voice, data and video. In another particular embodiment the estimated number of code violations further comprises an average number of code violations for each of the plurality of profiles for each line in the group of problem lines. In another particular embodiment the code violation data is collected in real time. In another particular embodiment the code violation data is accessed from a historical code violation database.

In another particular embodiment the computer program further includes applying the selected one of the plurality of profiles to one of the plurality of problem lines. In another particular embodiment the computer program further includes results indicating the selected profile for the problem line. In another particular embodiment the computer program the digital subscriber lines are associated with a digital subscriber line aggregator multiplexer. In another aspect of a particular embodiment the computer program the code violation data is stored on a digital subscriber line aggregator multiplexer.

An illustrative embodiment provides a computer-based stochastic model to predict Internet Protocol (IP) application degradation caused by IP network access line errors also referred to as code violations (CVs). A particular illustrative embodiment can be used by Internet service providers (ISPs) to 1) Improve broadband access user service performance, such as data applications (hypertext transfer protocol (HTTP), FTP, etc.), voice, and video in triple-play networks (networks providing data, voice and video); and 2) Facilitate service providers quality assurance to locate and fix quality of service problems (trouble-shooting) when service degradation occurs.

User application layer information may not be available to an ISP to estimate user application degradation caused by an IP access line physical impairment. Thus in the past, lab networks have been set up, testing equipment and software purchased, and tests performed on network quality of service. These lab test results were coded into a line optimization process. There are at least the following issues with this prior approach: 1: Every service line profile was tested and the results coded into optimization process before the profile was made part of an optimization process. 2: The test for each profile could take at least a week. 3: For some access technologies such as very-high-bit-rate DSL (VDSL), where there can be hundreds to thousands of possible profiles, the traditional lab approach can not feasibly generate results for so many profiles. Thus, in the past estimation for the vast majority of profiles may be extrapolated from the few available lab-generated data points. Moreover, lab test equipment for generating line impairments may have serious limitations. A lab noise generator can typically simulate only a limited set of line impairments. An illustrative embodiment presents a method and system to quickly predict and model the IP application impairments caused by physical line errors.

A particular illustrative embodiment provides a simulated user application and simulated line error based on a stochastic process model. Each model starts a simulated user application process, generates line errors based on real field code violation data or Poisson distribution (to expect N code violations in next M minutes) and models application impairment in cases of line errors hitting a user application packet. Each test run takes a matter of a few hundred milliseconds of processor time. To run 100 tests in order to reduce statistical fluctuation to $1/10$, consumes less than 30 seconds. In an illustrative embodiment, the simulator can easily be reconfigured to test different application scenarios. The illustrative embodiment includes a software-based model and can be written with almost any computer languages.

In an illustrative embodiment, the computer model uses lab testing for benchmarking. Corrections can be made in the model based on lab testing results. The present invention can be used where lab testing does not feasibly work, such as in VDSL, where there are too many profiles to be tested in the lab. Coupled with lab results, the present invention can also reduce statistical errors and make the line performance improvement more accurate.

Figure 2:
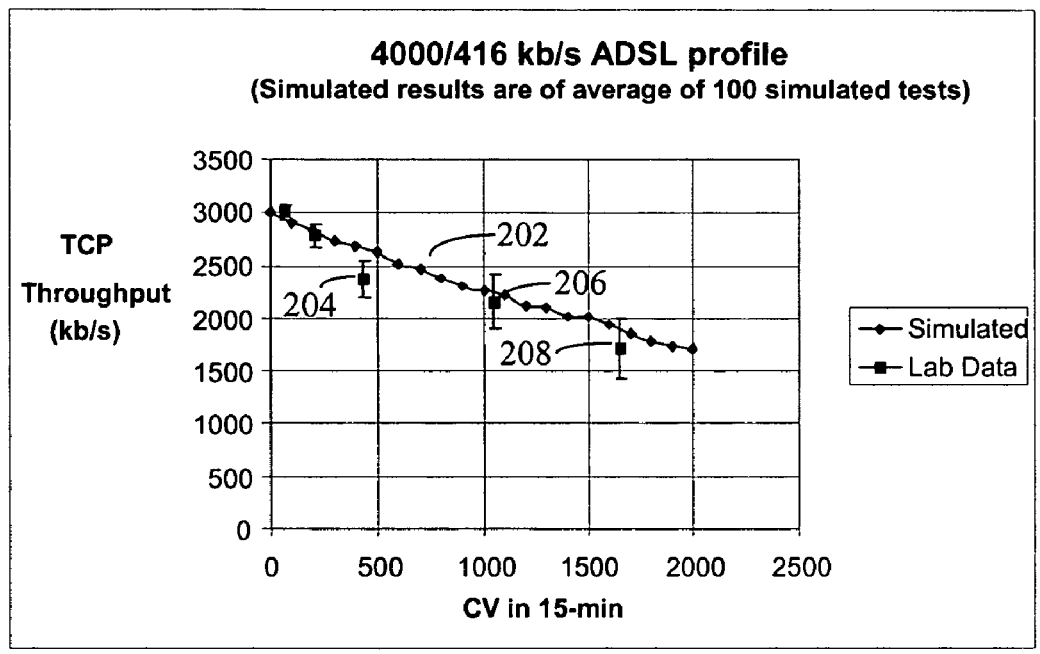
Figure 3:
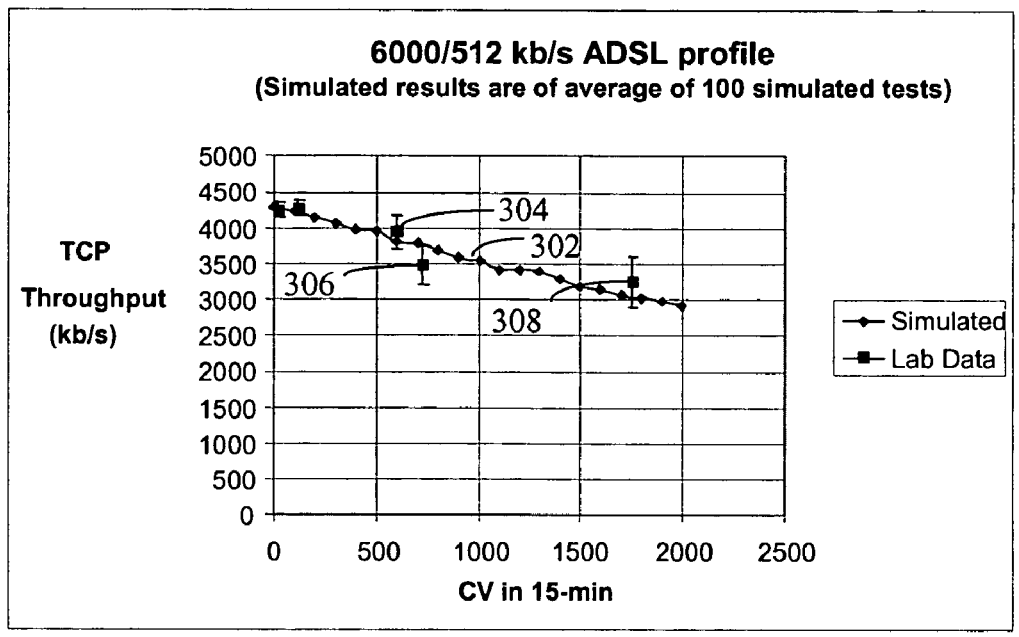

FIGS. 1-3 illustrate graphs 100, 200, 300 that display the results of both the modeling results 102, 202, 302 and lab tests 104, 106, 108, 204, 206, 208, 304, 306, and 308 which estimate the transfer control protocol (TCP) throughput drop in presence of ADSL CVs. CV is also the term for line errors in DSL technologies. The graphs show the TCP throughput of one of our TCP scenarios in which 20 files were transmitted in downstream direction one after another. The file size increases from first to the last file with 5% increase in each step. Then average TCP throughput is calculated and plotted in the graphs.

As shown in the graphs 100, 200, 300, lab test data fit well with modeling results. The error bar on each lab test point represents one standard deviation estimated by the model. The error on the data points are $1/10$ of that on lab data point because it is the average of 100 data tests. It takes less than 10 minutes to generate the entire modeling curve. The relative smooth curve of simulated model data also indicates that the simulated data has much smaller errors than that of lab data points which jump up and down from one point to another. Additionally, while curves can have a relatively good CV step, such as every 100 CVs, it is difficult to generate lab tests that perform the same, since the CV level is extremely difficult to control in lab tests. Therefore lab test data points are usually sparse.

A particular illustrative embodiment uses a computer-based model to simulate access line error's impact on higher layer applications (web browsing, video and voice). Consider ADSL for example, regardless of whether the line is being used by a user or not, ADSL lines send data frames at a fixed rate. Sometimes there are line errors due to the presence of electromagnetic (EM) noise. ADSL has a way of checking the integrity of data in the presence of the EM noise. When there are data (herein the data is a physical level ISO concept) integrity violations, also referred to herein as code violations (CVs). When the user is using the line to transmit user data (for example TCP/IP packets) in packets, the data packets are assigned into ADSL data frames and transmitted. TCP layer also checks data integrity which may have nothing to do with the ADSL layer data integrity check. When there is a TCP data error, a TCP packet will be dropped and re-sent which lowers the TCP throughput.

In a particular illustrative embodiment inputs to the model are the number of CVs (or physical level errors) in any given period of time. The number of CVs can be data stored in any form of storage or captured in real time, meaning measured number of errors from a network. In an illustrative embodiment, outputs from the model can be a set of rules which define at what CV level, which profile (speed, interleave/fast channel, etc.) an access line should take to get improved user application performance. In a particular illustrative embodiment a profile is selected that offers the most improvement or close to the most improvement in line quality. In an illustrative embodiment, a model simulates CV events as a stochastic process and calculates the probability of a physical error hitting a user data packet. The model simulates TCP/IP, real time transport protocol (RTP), user datagram protocol (UDP) or any application protocol behavior when there are user data errors (caused by CVs) to calculate the throughput.

CV definition can vary by technology. Different technologies may have different definitions of physical errors or CVs. Taking ADSL as an example. There are 4000 ADSL frames/second. 67 frames are grouped into one super frame. Some of bits in each ADSL frames are allocated as super frame's cyclic redundancy check (CRC) bits. The superframe's CRC is checked and if there are bit errors found anywhere in the super frame, it is deemed a CV. By definition, one superframe can only caused 1 CV, regardless whether there is one bit error or there are 100 bit errors. For VDSL, the definition is slightly different. Thus the CV definition may vary by technology. CV measurements: CVs are usually stored in switches (DSLAMs in ADSL network). 8 hours or sometimes 48 hours of data are kept in DSLAM database accessible to a processor in an illustrative embodiment. The DSLAM database provides a user interface from which data can be retrieved. The DSLAMs interface is referred to as TL1.

Whether a DSL code violation causes a TCP retransmission is a random occurrence. If a code violation happens to occur in an ADSL data frame which is not carrying user data, it causes no delay on user application. Therefore for low level line errors, the same number of code violations could cause very different TCP throughput drop. A particular illustrative embodiment estimates an average of the TCP throughput drop.

An illustrative embodiment provides a model that uses a computer simulated random code violation generator and also simulates ADSL and TCP processes. The model estimates the TCP throughput drop based on simulated application code violations and processes. Multiple processes can be simulated simultaneously to calculate the average TCP throughput drop. As a DSL service provider, one goal is to provide DSL customers the substantially best possible TCP/IP throughput, substantially best possible voice/video quality instead of the best physical level speed. The TCP/IP throughput is determined by DSL physical level speed, code violation level and other factors (such as overhead, file size, etc.).

In an illustrative embodiment, TCP Throughput≅F (DSL speed, CV level). A DSL service provider may not have knowledge or data on user application layer, and therefore may not know what TCP throughput the user is experiencing. An illustrative embodiment provides a fast and accurate way to estimate TCP throughput from DSL speed and CVs. An illustrative embodiment can tune the DSL line (i.e., adjust the line profile for the DSL line) and trade speed for fewer code violations to improve TCP/IP throughput. A DSL line can be configured to different profiles of different speed and error correction modes (fast channel or interleaved channel) to tune its' error correction power. Whichever profile gives an improved or substantially close to maximum TCP throughput is the profile selected for use for the line.

In a particular embodiment, the present application discloses an automated digital subscriber line performance control system comprising a computer system including a logic module to evaluate performance of a plurality of DSL lines and to automatically select a set of DSL lines from the plurality of DSL lines, a line profile database responsive to the computer system, the line profile database providing line profiles in response to a request from the computer system, and a digital subscriber line access multiplexer coupled to the computer system. The digital subscriber line access multiplexer is configured to measure a performance parameter of physical DSL lines and to change a profile for at least one of the DSL lines. The set of DSL lines has degraded performance characteristics based on historical performance data.

In another embodiment, an automated method of adjusting digital subscriber line (DSL) performance is disclosed. The method includes modeling performance of a plurality of DSL lines using a computer based system; automatically selecting a set of DSL lines from the plurality of DSL lines, the set of DSL lines having degraded performance characteristics based on historical performance data accessible with respect to the computer based system; retrieving a plurality of line profiles from a profile database; modeling a performance parameter for each DSL line in the set of DSL lines; removing from the set of DSL lines any DSL lines that have suitable performance based on the measured performance parameter to create a revised set of DSL lines with degraded performance; and applying one of the plurality of line profiles to each of the physical DSL lines identified by the revised set of DSL lines.

Figure 4:
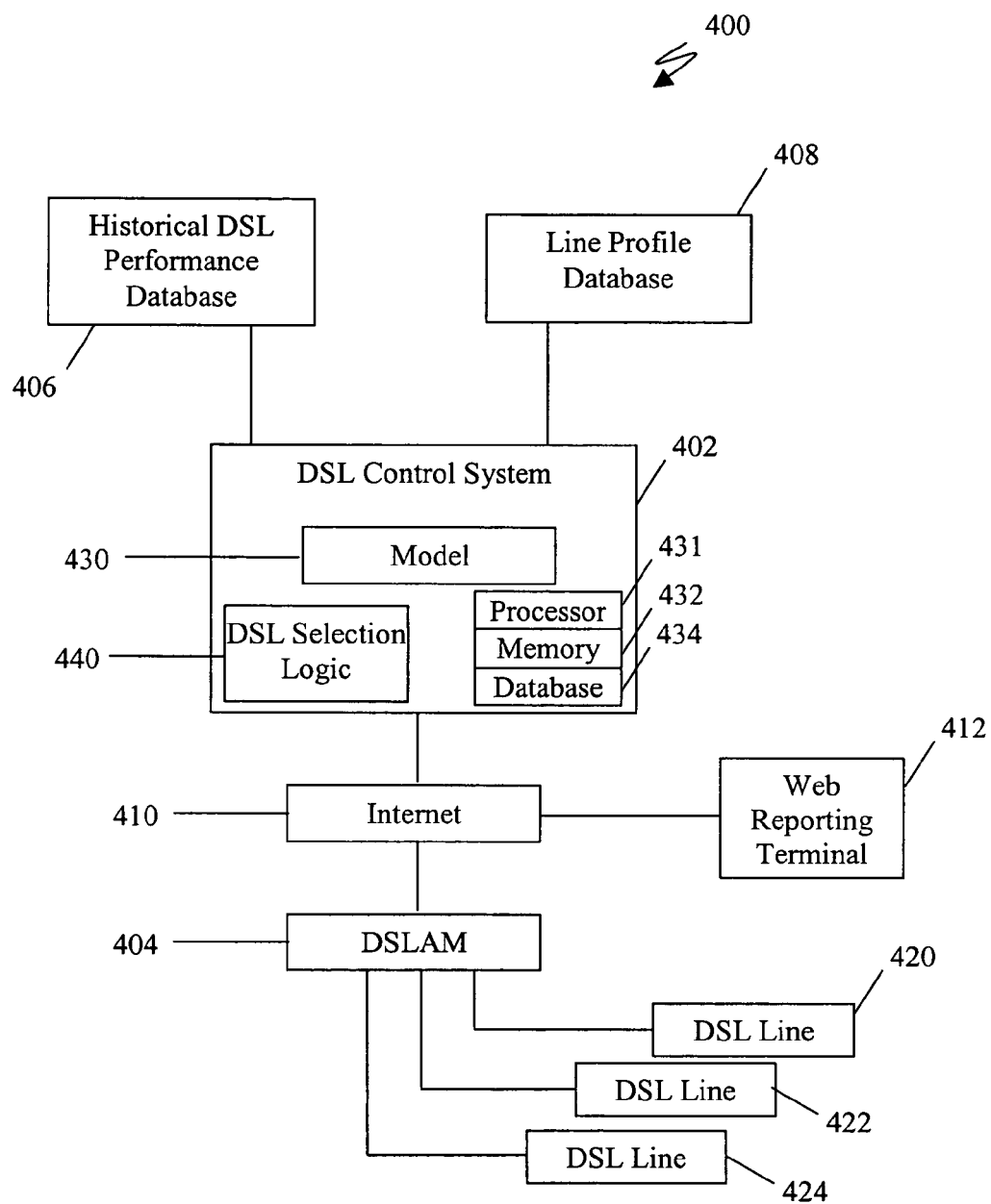
FIG. 4 is a block diagram of an illustrative embodiment DSL network and a DSL control system.

Referring to FIG. 4, a system in accordance with an embodiment of the present invention is illustrated. The system includes a digital subscriber line (DSL) control system 402, an internet network core 410, and a digital subscriber line access multiplexer (DSLAM) 404. The system also includes a line profile database 408 and a historical DSL performance database 406 coupled to the DSL control system 402. In addition, the system includes a remote web-based reporting terminal 412 coupled to the internet 410. The DSLAM 404 is connected to the internet 410 and connects to a plurality of DSL lines 420 such as illustrated DSL lines 420, 422, and 424. The DSL control system 402 includes evaluation logic 430 and DSL line selection logic 440. The DSL control system 402 can include a processor 431, memory 432 and database 434. In an illustrative embodiment the memory contains instructions that when executed by the processor perform the method of an illustrative embodiment.

The DSL control system 402 may be implemented as a computer system that includes software stored in the memory 432 to execute the model 430 and the DSL selection logic 440. The web-based reporting terminal 412 may be a computer workstation, or personal computer with a display device that includes an input device and a computer processor. An example is a computer workstation that may be operated by a user for viewing reports as to DSL network performance and statistics. The DSL performance database 406 and the line profile database 408 may be implemented with standard computer database technology.

Figure 5:
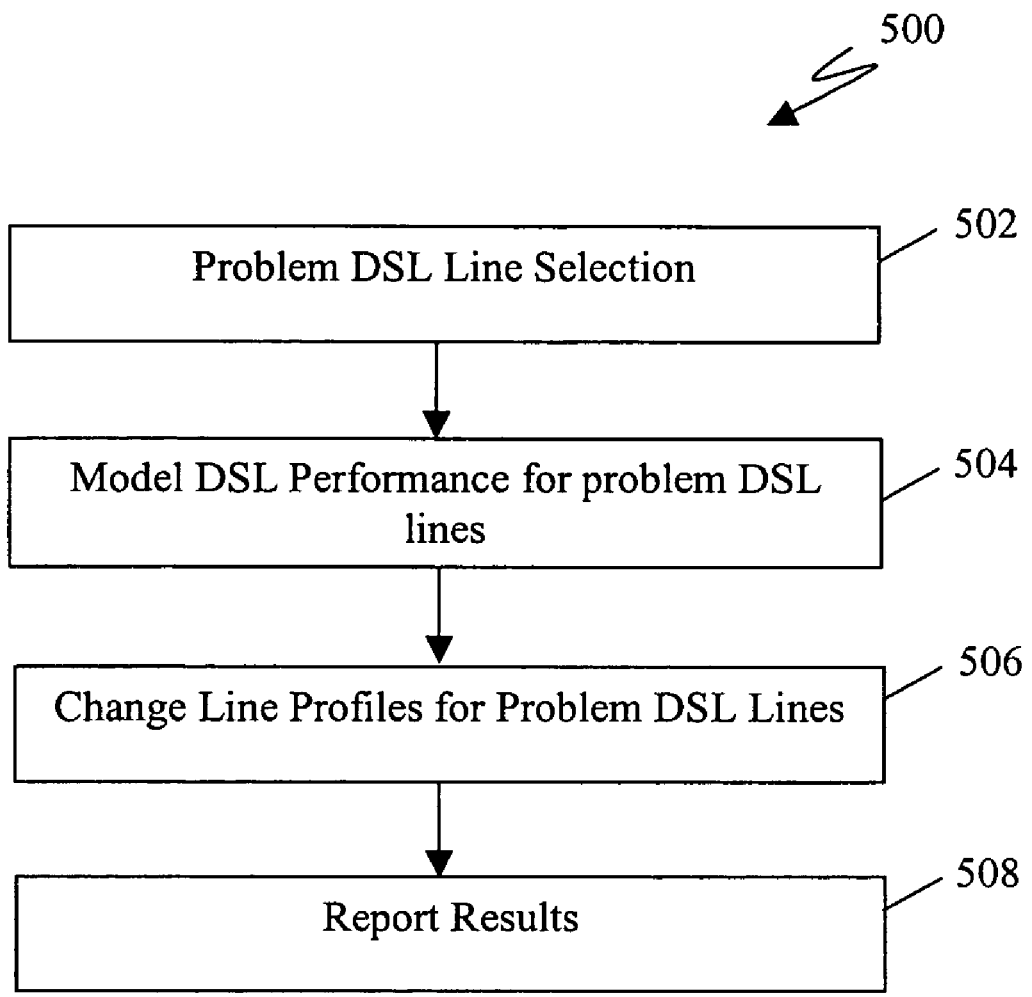
FIG. 5 is a flowchart of an illustrative method of adjusting DSL line performance.

Referring to FIG. 5, operation of the system illustrated in FIG. 4 is described. At step 502, a problem DSL line selection is made. For example, historical DSL performance data for various DSL lines supported by the DSLAM 404 may be evaluated to determine those DSL lines that have reduced performance or performance below a defined performance threshold. In this manner, one or more problem DSL lines may be selected. Selection logic to determine and evaluate the historical DSL performance data may be performed, such as by using the DSL selection logic unit 440 within the DSL control system 402. DSL performance for various lines is measured, at step 504. This step may be performed on all DSL lines or may be performed only on the reduced set of DSL lines that are identified as problem lines. The measurement of DSL performance made on selected problem lines is performed to confirm that the problem DSL line status through an additional measurement.

Line profiles for the degraded DSL lines are changed, at step 506. For example, the DSL lines that were initially selected, at step 502, and then verified as having performance problems at step 504, would have their line profiles and CVs modeled, at step 506. An example of a modeled line profile includes a change to a reduced speed profile or to a channel interleaved profile to assist the performance of the problem DSL line selected. As discussed above, CVs for the selected line are stochastically modeled for modeled applications using different profiles. A profile is selected having an improved performance or decreased CV count. A report of the results of problem DSL lines is provided using a web-reporting tool, at 508. For example, a performance measurement of the DSL line may be taken after the profile has been changed. The performance of selected problem DSL lines may be modeled, measured and reported both before and after the profile change. A display report may be reported to an operator, such as via a remote web-based reporting terminal 412. In this matter, an operator of a network may observe performance measurements for problem DSL lines and may observe and evaluate those problem DSL lines before and after a change of profile has been made.

Figure 6:
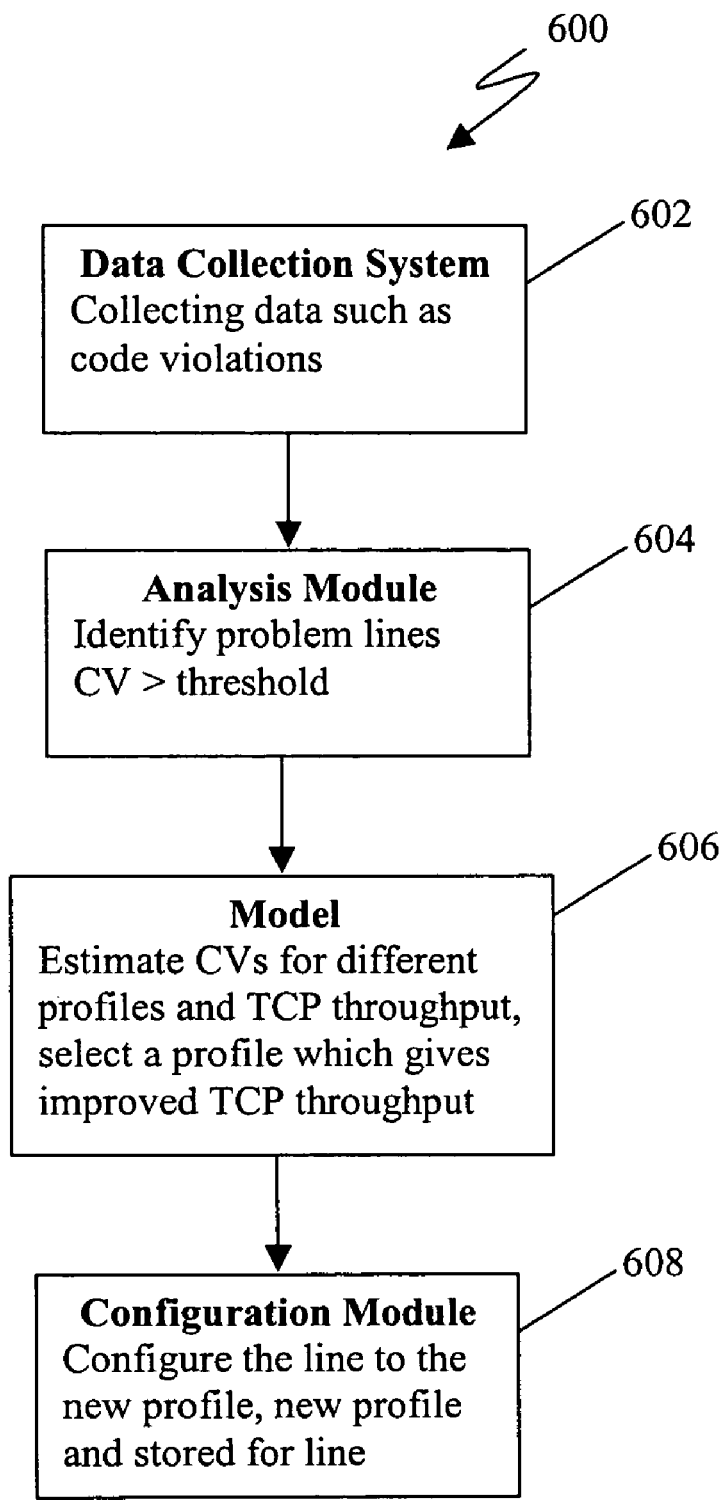
FIG. 6 is a flowchart of an illustrative detailed method of adjusting DSL line profiles.

Referring to FIG. 6, a further detailed flow chart that illustrates operation of the system of FIG. 4 is shown. Performance of the plurality of DSL lines is evaluated using a computer-based model such as a data collection system that collects data such as code violations, at step 602. An example of such a computer-based system would be the DSL control system 402. The set of DSL lines is automatically selected from a plurality of available DSL lines, at step 604. The analysis module identifies problem lines by determining which lines have a CV count that exceeds a predetermined threshold. The threshold may vary by application. The set of DSL lines having degraded performance (problem lines) characteristics may be determined based on historical performance data that is accessible to the computer-based system, as shown at step 604. For example, historical DSL performance data 406 may be evaluated by the DSL selection logic 404 within the DSL control system 402, with respect to a set of DSL lines supported by DSLAM 404.

A group of line profiles is then retrieved from a profile database, at step 606, and CVs estimated by the model for different profiles and TCP throughput, at step 606. A profile is selected by the model that gives an improved performance for the line. In another particular embodiment a profile is selected that gives substantially the most improved performance for the line. A configuration module configures the line to the new profile at step 608. For example, a reduced speed profile or an interleaved profile would be modeled for each of the DSL lines that are identified by the revised set of DSL lines. Data associated with the revised set of DSL lines is then stored. An example of such data would be performance data measured after application of the new line profile to the DSL lines. The stored data is then reported, such as by using a remote internet browsing tool. An error message is reported if application of the profile to a physical DSL line fails. For example, where a new line profile is attempted to be applied to a physical DSL line and that new line profile is unable to be applied, an error message could be reported at the web-based reporting terminal 412. The error report provides for operator awareness and allows subsequent action to be taken by the operator.

The system and method illustrated with respect to FIGS. 4-6 above disclose an automated system and may be used with many DSL lines and multiple DSLAM units in a deployed network. With this automated system, thousands of lines may be measured and adjusted automatically, including periodically or on a scheduled basis. With automated adjustments, human intervention is either not needed or, is significantly reduced. The processing time to measure and adjust each DSL line typically uses less than one minute of computer time. The same operation performed by a service technician manually, could take half an hour or longer, depending on the skill of the technician and the complexity of the DSL problem. In addition, using manual service technicians may result in one or more truck rolls adding further cost to DSL maintenance in the network.

The disclosed system utilizes automated methods and provides for improved DSL line performance. In addition, the system removes a significant level of human influence in the process and provides for enhanced performance at a lower cost. Further, line profile adjustments are often a difficult and error prone process and are well suited to an automated computer control technique as shown.

In addition, with traditional manual methods, only those problem lines identified by customer calls would get attention. In the disclosed system, many problem lines are detected automatically and profiles may be automatically corrected to prevent these problem customer calls. Thus, customer service and DSL line performance is improved while maintenance costs are further reduced. In this manner, not only are customer complaints taken care of expeditiously, but many problems are fixed where neither the company nor the customer have been formally identified, thus, preventing potential subscriber loses. In addition, using a web-based reporting terminal, reports may be generated that include information, such as a list of problem lines selected, lines that fail in the adjustment process, lines that are adjusted successfully, and a line performance matrix that shows performance before and after the line profile has been applied. Thus, a useful reporting tool for network operators is also provided.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Figure 7:
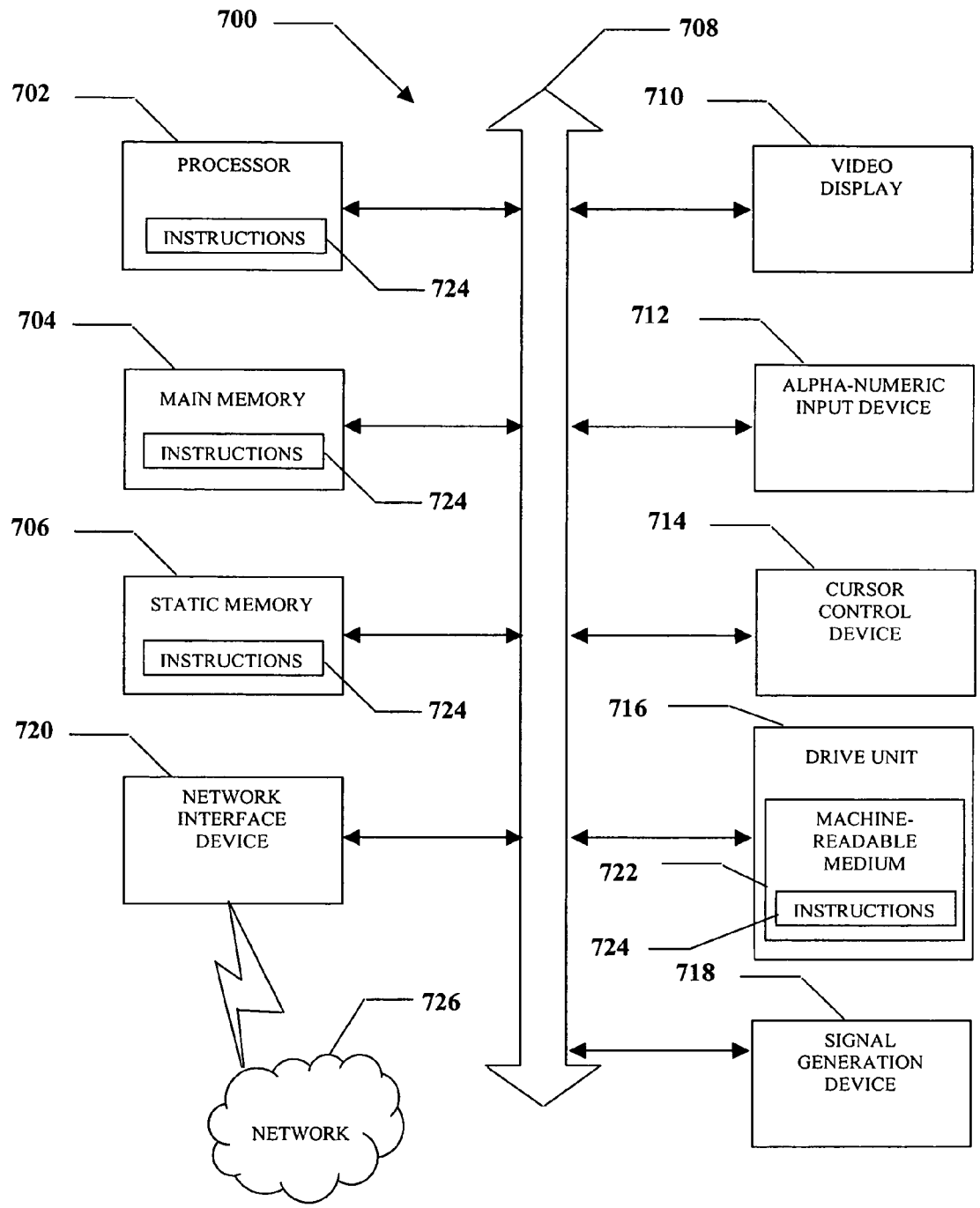
FIG. 7 is an illustrative embodiment of a machine for performing illustrative functions disclosed.

FIG. 7 is a diagrammatic representation of a machine in the form of a computer system 700 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated in herein above. The instructions 724 may also reside, completely or at least partially, within the main memory 704, the static memory 706, and/or within the processor 702 during execution thereof by the computer system 700. The main memory 704 and the processor 702 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

It should be noted that while the preferred embodiment of this video distribution architecture utilizes a FTTN or FTTH broadband network for IPTV delivery, it could similarly be implemented to work on alternative access networks including digital cable networks, satellite television systems, terrestrial wireless delivery networks (e.g. WiMAX) as bandwidth improves, or even 3G and 4G wireless networks using wireless handsets as the video authoring station.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for selecting a profile for a digital subscriber line comprising:
    collecting code violation data for a plurality of digital subscriber lines;
    identifying a group of problem lines in the plurality of digital subscriber lines;
    reporting an estimated number of code violations for one line of the group of problem lines;
    modeling an estimated number of code violations for each of a plurality of profiles for a plurality of processes simultaneously for each line of the group of problem lines to calculate an average transmission control protocol throughput drop for each of the group of problem lines for the plurality of processes;
    selecting one line of the plurality of profiles;
    applying the selected one of the plurality of profiles to one line of the group of problem lines; and
    reporting an estimated number of code violations for the one line of the group of problem lines after applying the selected one of the plurality of profiles to the one line of the group of problem lines.

2. The method of claim 1, wherein the modeling further comprises stochastic modeling, the method further comprising:
    reporting when the applying the selected one of the plurality of profiles was unsuccessful.

3. The method of claim 1, wherein the selecting one of the plurality of profiles further comprises selecting one of the plurality of profiles which has a reduced number of estimated code violations for the one line of the group of problem lines.

4. The method of claim 1, wherein the modeling further comprises modeling a plurality of internet protocol applications and stochastically modeling estimated code violations for each of the plurality of internet protocol applications simultaneously for each of the group of problem lines; and
    removing from the group of problems lines any digital subscriber line having suitable performance.

5. The method of claim 4, wherein each of the plurality of internet protocol applications are selected from the group consisting of voice, data and video.

6. The method of claim 1, wherein the estimated number of code violations further comprises an average number of code violations for at least one of the plurality of profiles for at least one line of the group of problem lines.

7. The method of claim 1, wherein the code violation data is collected before the applying the selected one of the plurality of profiles to the one of the group of problem lines.

8. The method of claim 1, wherein the code violation data is accessed from a historical code violation database.

9. The method of claim 1, further comprising:
    reporting results indicating the selected profile for the one line of the group of problem lines.

10. The method of claim 1, wherein the plurality of digital subscriber lines are associated with a digital subscriber line aggregator multiplexer.

11. The method of claim 1, wherein the code violation data is stored at a digital subscriber line aggregator multiplexer.

12. A non-transitory computer readable medium containing a computer program comprising instructions that when executed by a computer perform functions that select a profile for a digital subscriber line, the computer program comprising:
    instructions to collect code violation data for a plurality of digital subscriber lines;
    instructions to identify a group of problem lines in the plurality of digital subscriber lines;
    instructions to model an estimated number of code violations for each of a plurality profiles simultaneously for a plurality of processes for each one of the group of problem lines to calculate an average transmission control protocol throughput drop on each one line of the group of problem lines for the plurality of processes; and
    instructions to select one of the plurality of profiles having an acceptable transmission control protocol throughput drop.

13. The medium of claim 12, wherein the instructions to model further comprise:
    instructions to stochastic modeling the computer program further comprising:
    instructions to report code violation data for the one line of the group of problems lines;
    instructions to apply the selected one of the plurality of profiles to the one line of the group of problem lines; and
    instructions to report code violation data for the one line of the group of problems lines after applying the selected one of the plurality of profiles.

14. The medium of claim 12, wherein instructions to select one of the plurality of profiles further comprise:
    instructions to select one of the plurality of profiles which has a reduced number of estimated code violations for the one of the group of problem lines, the computer program further comprising instructions to report when the selected one of the plurality of profiles cannot be applied to the one line of the group of problem lines.

15. The medium of claim 12, wherein the instructions to model further comprise:
    instructions to model a plurality of internet protocol applications simultaneously;
    and instructions to stochastically model estimated code violations for each of the plurality of internet protocol applications for each one of the group of problem lines for the plurality of internet protocol applications.

16. The medium of claim 15, wherein the plurality of internet protocol applications are selected from the group consisting of voice, data and video.

17. The medium of claim 12, wherein the estimated number of code violations further comprises an average number of code violations for at least one of a group of profiles for at least one line of the group of problem lines.

18. The medium of claim 12, wherein the code violation data is collected in real time after the one of the plurality of profiles is applied to the one line of the group of problem lines.

19. The medium of claim 12, wherein the code violation data is accessed from a historical code violation database.

20. The medium of claim 12, the computer program further comprising:
instructions to apply the selected one of the plurality of profiles to the line one of the group of problem lines.

21. The medium of claim 12, the computer program further comprising:
instructions to report results indicating the selected profile for the one problem line.

22. The medium of claim 12, wherein the plurality of digital subscriber lines are associated with a digital subscriber line aggregator multiplexer.

23. The medium of claim 12, wherein the historical code violation data is stored on a digital subscriber line aggregator multiplexer.

24. A system for selecting a profile for a digital subscriber line, the system comprising:
a processor in data communication with a memory in a non-transitory computer readable medium; and
a computer program stored in the memory, the computer program comprising instructions to collect code violation data for a plurality of digital subscriber lines,
instructions to identify a group of problem lines in the plurality of digital subscriber lines,
instructions to model an estimated number of code violations for each of a plurality profiles simultaneously for a plurality of processes for one of the group of problem lines to calculate an average transmission control protocol throughput drop for the one of the group of problem lines for the plurality of processes and instructions to select one of the plurality of profiles having an acceptable average transmission control protocol throughput drop.

25. The system of claim 24, wherein the instructions to model further comprises instructions to stochastically model, the computer program further comprising instructions to report code violations for the one line of the group of problems lines, instructions to apply the selected one of the plurality of profiles to one line of the group of problem lines; and instructions to report code violations for the one of the group of problems lines after applying the selected one of the plurality of profiles.

26. The system of claim 24, wherein the instructions to select the one of the plurality of profiles further comprises instructions to select one of the plurality of profiles which has a reduced number of estimated code violations for the one of the group of problem lines, the computer program further comprising instructions to report when the instructions to apply the selected one of the plurality of profiles to one of the group of problem lines were unsuccessful.

27. The system of claim 24, wherein the instructions to model further comprise instructions to model a plurality of internet protocol applications and stochastically model estimated code violations for each of the plurality of internet protocol applications for the one of the group of problem lines.

28. The system of claim 27, wherein the plurality of internet protocol applications are selected from the group consisting of voice, data and video.

29. The system of claim 24, wherein the estimated number of code violations further comprises an average number of code violations for at least one of the plurality of profiles for the one of the group of problem lines.

30. The system of claim 24, wherein the historical code violation data is collected in real time.

31. The system of claim 24, wherein the code violation data is accessed from a historical code violation database.

32. The system of claim 24, wherein the computer program further comprises instructions to apply the selected one of the plurality of profiles to the one of the group of problem lines.

33. The system of claim 24, the computer program further comprising instructions to report results indicating the selected profile for the one of the group of problem lines.

34. The system of claim 24, wherein the plurality of digital subscriber lines are associated with a digital subscriber line aggregator multiplexer.

35. The system of claim 24, wherein the code violation data is stored on a digital subscriber line aggregator multiplexer.

* * * * *